United States Patent
Wilson et al.

(10) Patent No.: US 7,570,587 B1
(45) Date of Patent: Aug. 4, 2009

(54) RESOURCE ALLOCATION FOR MULTI-SERVICE GATEWAYS

(75) Inventors: Paul G. Wilson, Kanata (CA); Stanley W. Joyner, San Ramon, CA (US); Terry L. Stumpf, Apex, NC (US)

(73) Assignee: Nortel Networks Limited, Montreal, Quebec (CA)

( * ) Notice: Subject to any disclaimer, the term of this patent is extended or adjusted under 35 U.S.C. 154(b) by 1450 days.

(21) Appl. No.: 09/735,542

(22) Filed: Dec. 14, 2000

(51) Int. Cl.
*H04L 12/26* (2006.01)

(52) U.S. Cl. ............... 370/230; 370/235; 370/252; 370/395.42

(58) Field of Classification Search ............... 370/229, 370/230, 235, 238, 252, 255, 352, 353, 395.52, 370/395.21, 395.2, 395.42, 354, 355, 356
See application file for complete search history.

(56) References Cited

U.S. PATENT DOCUMENTS

| | | | | |
|---|---|---|---|---|
| 5,644,766 A | * | 7/1997 | Coy et al. | 707/204 |
| 5,862,485 A | * | 1/1999 | Linneweh et al. | 455/450 |
| 6,014,556 A | * | 1/2000 | Bhatia et al. | 455/404.1 |
| 6,026,086 A | * | 2/2000 | Lancelot et al. | 370/353 |
| 6,167,028 A | * | 12/2000 | Harris | 370/230 |
| 6,460,082 B1 | * | 10/2002 | Lumelsky et al. | 709/226 |
| 6,516,059 B1 | * | 2/2003 | Shaffer et al. | 379/211.02 |
| 6,717,913 B1 | * | 4/2004 | Ghahremani et al. | 370/230 |
| 6,738,637 B1 | * | 5/2004 | Marinho et al. | 455/512 |
| 6,980,515 B1 | * | 12/2005 | Schunk et al. | 370/230.1 |
| 7,007,075 B1 | * | 2/2006 | Coffey | 709/219 |
| 2001/0001000 A1 | * | 5/2001 | Thomas et al. | 370/200 |
| 2002/0035463 A1 | * | 3/2002 | Lynch et al. | 703/21 |

* cited by examiner

*Primary Examiner*—Chi H. Pham
*Assistant Examiner*—Shick Hom (57) ABSTRACT

A method of processing a request for a connection through a multi-service gateway and a multi-service gateway for performing the method. The method includes allocating resources from a resource pool as a function of a usage level of the pool, as a function of a priority level of the connection request and as a function of an occupancy threshold associated with the pool. In particular, if the usage level of the resources in the pool is below the occupancy threshold, processing resources are allocated to satisfy the connection request. However, if the usage level of the resources in the pool is not below the occupancy threshold, resources may or may not be allocated to satisfy the connection request, depending on the priority level of the connection request. As a result, the multi-service gateway of the present invention affords a significant increase in the proportion of packet-switched ports which are available for use, while the effect on blocking probability under common traffic mix conditions can be kept to within reasonable limits by suitable selection of the occupancy threshold.

26 Claims, 5 Drawing Sheets

| CALL MODEL | TYPE OF RESOURCE ALLOCATION | USABLE ATM PORTS (OUT OF 2016) | TOTAL USABLE PORTS (OUT OF 4032) | PORT USAGE EFFICIENCY |
|---|---|---|---|---|
| SPRINT TRAFFIC MODEL WITH 10% FEATURE PENETRATION | THRESHOLD = 2, PBLOCK = 10E-10 | 1493 | 3509 | 87% |
| | THRESHOLD = 3, PBLOCK = 10E-12 | 1453 | 3469 | 86% |
| UCS TRAFFIC MODEL WITH 10% FEATURE PENETRATION | THRESHOLD = 2, PBLOCK = 10E-10 | 1459 | 3575 | 89% |
| | THRESHOLD = 3, PBLOCK = 10E-12 | 1352 | 3368 | 84% |

FIG. 5

RESOURCE ALLOCATION FOR MULTI-SERVICE GATEWAYS

FIELD OF THE INVENTION

The present invention relates generally to multi-service gateways used for enabling the convergence of circuit-switched networks and packet data networks. More particularly, the invention pertains to the manner in which processing resources are allocated within a multi-service gateway.

BACKGROUND OF THE INVENTION

Many existing voice networks are circuit-switched time-division multiplexed (TDM) networks designed to accommodate 125-microsecond time slots. Such networks are incompatible with existing packet data networks, most of which are either based on the Internet Protocol (IP) at layer 2 and/or on the Asynchronous Transfer Mode (ATM) at layer 3. In order to build a unified network architecture in which circuit-switched voice networks are seamlessly integrated with packet data networks, it is of importance to provide the capability to link the two types of networks together.

Figure 1:
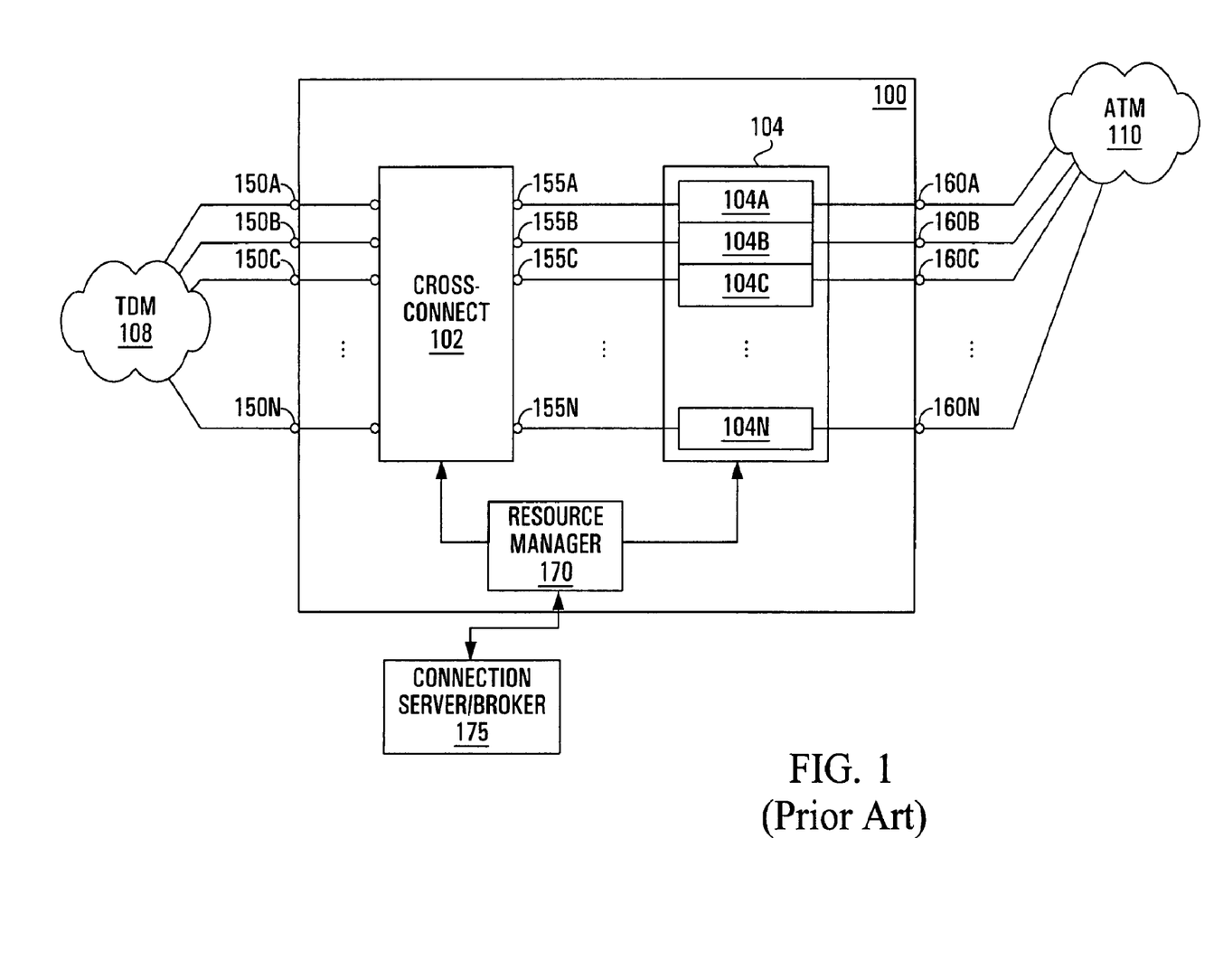
FIG. 1 is a block diagram of a conventional multi-service gateway.

To provide conversion between widely differing signaling formats, it is common to use a so-called trunk gateway, also known as a multi-service gateway (MG). As shown in FIG. 1, a multi-service gateway 100 typically has, at one end, a set of N external circuit-switched ports 150A-N connected to a circuit-switched network 108 (such as a TDM network) and, at another end, a set of N external packet-switched ports 160A-N connected to a packet-switched network 110 (such as an ATM network).

Traditionally, there have been two basic types of connections supported by a conventional multi-service gateway. Firstly, the multi-service gateway 100 is used for establishing individual connections between the circuit-switched network 108 and itself, each such connection taking up two external circuit-switched ports. Second, the multi-service gateway 100 is used for establishing individual connections between the circuit-switched network 108 and the packet-switched network 110, each such connection taking up one external circuit-switched port and one external packet-switched port.

In order to provide the desired connectivity, a conventional multi-service gateway 100 comprises circuit-switched processing resources 102 and packet-switched processing resources 104. The circuit-switched processing resources 102 are typically embodied as a cross-connect 102 that is connected at one end to the external circuit-switched ports 150A-N and has a like number of internal circuit-switched ports 155A-N. The cross-connect 102 establishes circuit-switched connections in accordance with a mapping that is controlled by and received from a resource manager 170. The mapping specifies circuit-switched connections defined either between external circuit-switched ports and internal circuit-switched ports or between pairs of external circuit-switched ports.

In a conventional multi-service gateway, the packet-switched processing resources 104 are divided into N port processing software entities (PPSEs) 104A-N, each of which is reserved for establishing connections between a respective one of the external packet-switched ports 160A-N and a respective one of the internal circuit-switched ports 155A-N. Each dedicated PPSE is typically equipped with circuitry or software for converting a circuit-switched signal arriving from the corresponding internal circuit-switched port into a packet-switched signal exiting via the corresponding external packet-switched port. For the purposes of illustration, the required conversion is assumed to be TDM-ATM conversion. Each PPSE thus performs TDM-ATM conversion for a dedicated pair of ports in response to receipt of a control message from the resource manager 170.

A connection server/broker 175 generates connection requests defining proposed connections between pairs of ports. The connection requests are sent to the resource manager 170. The resource manager 170 operates by setting the mapping of the cross-connect 102 and controlling the behaviour of the PPSEs 104A-104N in response to connection requests received from the connection server/broker 175. Thus, for example, in response to a connection request specifying external circuit-switched port 150A and external packet-switched port 160B, the resource manager 170 first sets the mapping of the cross-connect 102 so that it passes the signal arriving on external circuit-switched port 150A through to internal circuit-switched port 155B, which is associated with PPSE 104B. The resource manager 170 then sends a control message to PPSE 104B, which supplies the required TDM-ATM conversion.

Alternatively, in response to a connection request specifying external circuit-switched ports 150A and 150B, the resource manager 170 appropriately sets the mapping of the cross-connect 102 to loop the signal arriving on external circuit-switched port 150A back towards external circuit-switched port 150B. No packet-switched processing resources are required. Thus, external packet-switched ports 160A and 160B remain idle and their associated PPSEs 104A and 104B will be unused for the duration of the TDM-TDM connection.

It is thus apparent that each TDM-TDM connection request prevents two PPSEs from performing any work until the TDM-TDM connection is torn down. Such an approach is helpful in eliminating the possibility of subsequent TDM-TDM or ATM-TDM connection requests being blocked. However, this same approach becomes a severe disadvantage when the range of connection types is expanded to include connections that involve the external packet-switched ports but do not involve the external circuit-switched ports.

Specifically, it will be apparent to one of ordinary skill in the art that a conventional multi-service gateway is prone to wastage of valuable packet-switched resources during a TDM-TDM connection, since the two PPSEs associated with the two idle external packet-switched ports are prevented from performing any work, even though they do not participate in the TDM-TDM connection. Such a situation, in which one or more PPSEs are at the same time both unused and unusable, effectively results in revenue loss for the operator of the multi-service gateway. Clearly, therefore, it would be desirable to harness the power of unused PPSEs and apply it to the establishment of ATM-ATM connections.

SUMMARY OF THE INVENTION

The multi-service gateway of the present invention affords a significant increase in the proportion of usable packet-switched ports. This is achieved by maintaining a pool of packet-switched processing resources and running a resource management algorithm that allocates the packet-switched processing resources to the packet-switched ports in accordance with the priority of the connection request, the usage level of the pool and an occupancy threshold. For instance, a connection request may be blocked if the usage level of the pool exceeds the occupancy threshold and the connection request has a low priority. By suitable selection of the occupancy threshold, the probability of blocking can be kept to within reasonable limits under common traffic mix conditions, with little impact on the throughput of the multi-service gateway.

Therefore, the invention may be summarized broadly as a method of processing a request for a connection through a multi-service gateway, including allocating resources from a resource pool as a function of: a usage level of the pool, a priority level of the connection request and a pool occupancy threshold.

The invention may be summarized according to a second broad aspect as a multi-service gateway, including a plurality of packet-switched ports; a pool of port processing software entities (PPSEs), each PPSE having sufficient capacity to provide processing for any of the packet-switched ports; and a resource manager. The resource manager is adapted to execute a method that includes receiving connection requests and, if a particular connection request involves at least one of the packet-switched ports, allocating a subset of the PPSEs in the pool for satisfying the particular connection request, as a function of a priority level of the particular connection request, as a function of a usage level of the pool and as a function of a pool occupancy threshold.

According to a third broad aspect, the invention may be summarized as a multi-service gateway, including a unit for receiving a connection request, a unit for determining a usage level of resources in a resource pool in the multi-service gateway; and a unit for allocating resources from the resource pool to satisfy the connection request if the usage level of the pool is below an occupancy threshold, otherwise determining a priority level of the connection request and allocating resources from the pool to satisfy the connection request only if the priority level of the connection request is higher than a pre-determined level.

The invention may also be summarized according to another broad aspect as computer-readable media tangibly embodying a program of instructions executable by a resource manager to perform a method of processing a received request for a connection through a multi-service gateway. The method includes determining a usage level of resources in a resource pool in the multi-service gateway; and allocating resources from the resource pool to satisfy the connection request if the usage level of the pool is below an occupancy threshold, otherwise determining a priority level of the connection request and allocating resources from the pool to satisfy the connection request only if the priority level of the connection request is higher than a pre-determined level.

According to still another broad aspect, the invention may be summarized as at least one computer programmed to execute a process for processing a received request for a connection through a multi-service gateway. The process includes determining the usage level of a resource pool in the multi-service gateway and, if the usage level is below the pool occupancy threshold, allocating resources from the resource pool to satisfy the connection request. Otherwise, if the usage level is not below the occupancy threshold, the process includes allocating resources from the pool to satisfy the connection request only if the priority level of the connection request is higher than a pre-determined level.

BRIEF DESCRIPTION OF THE DRAWINGS

These and other aspects and features of the present invention will now become apparent to those of ordinary skill in the art upon review of the following description of specific embodiments of the invention in conjunction with the accompanying drawings, in which.

DETAILED DESCRIPTION OF THE PREFERRED EMBODIMENTS

Figure 2:
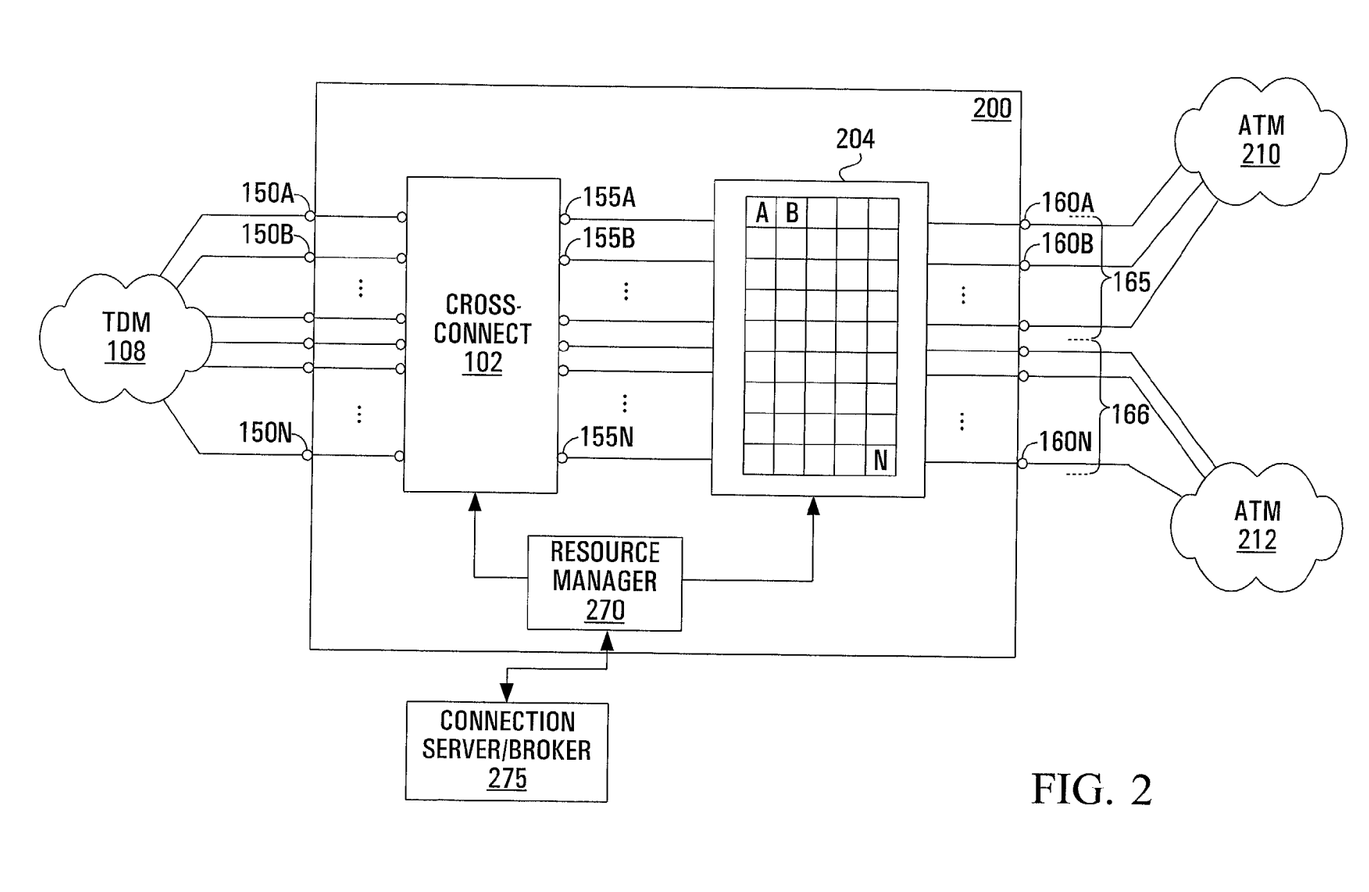
FIG. 2 is a block diagram of a multi-service gateway according to an embodiment of the present invention.

With reference to FIG. 2, there is shown a multi-service gateway 200 in accordance with an embodiment of the present invention, comprising a set of N external circuit-switched ports 150A-N and a set of N external packet-switched ports 160A-N. The external circuit-switched ports may be connected to a circuit-switched network 108, while the external packet-switched ports may be connected to one or more packet-switched networks. In the illustrated example, some of the external packet-switched ports (e.g., ports 165) are connected to a first ATM network 210 and other ones of the external packet-switched ports (e.g., ports 166) are connected to a second ATM network 212. In other embodiments of the invention, networks 210 and 212 could be Internet Protocol (IP) networks.

Figure 4:
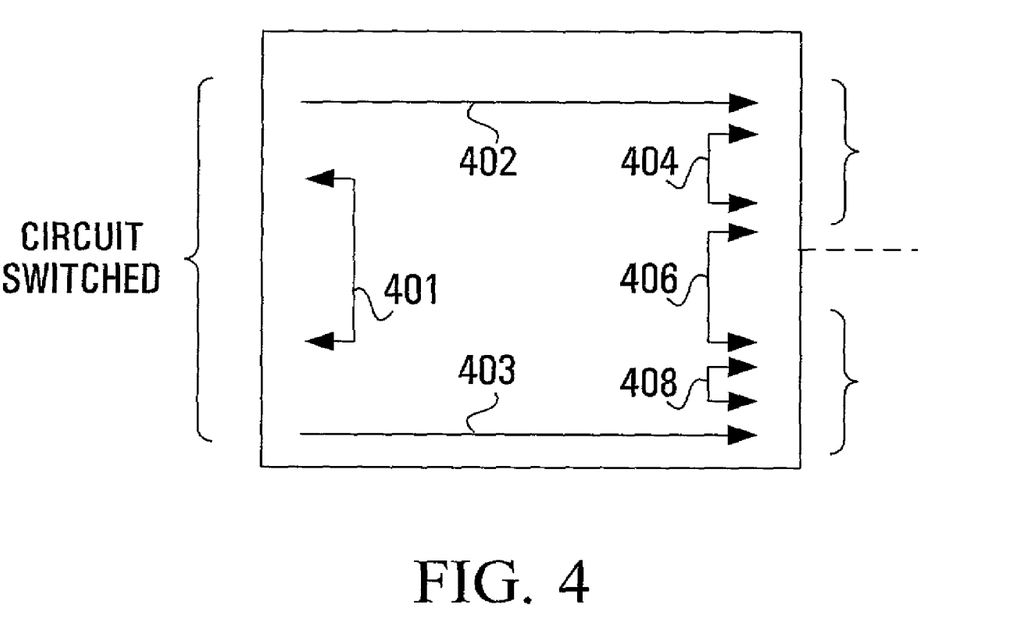
FIG. 4 shows different types of connections that can be established through the multi-service gateway of FIG. 2.

The range of possible connections which can be established by the multi-service gateway 200 (in FIG. 2) is greater than for the conventional multi-service gateway 100 (in FIG. 1) and is conceptually illustrated in FIG. 4. Specifically, the types of connections which can be established through the multi-service gateway 200 include type 401 (between the circuit-switched network 108 and itself), type 402 (between the circuit-switched network 108 and the first ATM network 210); type 403 (between the circuit-switched network 108 and the second ATM network 212); type 404 (between the first ATM network 210 and itself); type 405 (between the second ATM network 212 and itself); and type 406 (between the first and second ATM networks 210, 212).

A connection server/broker 275 is connected to a resource manager 270 in the multi-service gateway 200 and has knowledge of which ports are involved in the connections to be established by the multi-service gateway 200. The connection server/broker 275 is operable to send connection requests identifying the involved ports to the resource manager 270.

Each connection request received by the resource manager 270 from the connection server/broker 275 has a corresponding priority. The priority corresponding to a connection request is a function of various factors, such as the type of traffic with which the connection request is associated and the amount of network resources already consumed prior to arrival of the connection request at the resource manager 270. The priority level of a connection request may be encoded inside a header forming part of the connection request. Alternatively, the priority level of a connection request can be inherent from the type of traffic and from the amount of previously allocated network resources.

The following is a brief description of four possible types of traffic. Of course, it is to be understood that other traffic types and priority levels are also within the scope of the invention.

Originating Traffic

A connection request may be associated with so-called "originating" traffic, namely traffic that enters the multi-service gateway 200 from the circuit-switched network 108. "Originating" is also used to characterize traffic that has no other resources allocated within the multi-service gateway, i.e., traffic that is not a message from an existing call within the multi-service gateway. Originating traffic is thus of a relatively low priority and it is permissible to block a request for such traffic if there are insufficient packet-switched processing resources available in the multi-service gateway 200 to service the call.

Terminating Traffic

In other cases, a connection request may be associated with so-called "terminating" traffic, which enters the multi-service gateway 200 via the first ATM network 210. A request for terminating traffic can be blocked if there are insufficient packet-switched processing resources available in the multi-service gateway 200 to service the call.

However, because a certain amount of ATM network resources are likely to have been consumed by the time a connection request for terminating traffic is received, it may be moderately expensive to "back out" of such a connection request when it is blocked and thus terminating traffic is accorded a higher priority level than originating traffic.

Feature Traffic

Another type of traffic is so-called "feature" traffic, which may represent, for example, an announcement being delivered from the first ATM network 210 or a third party joining an existing call from the second ATM network 212. In order to deliver the promise of a network claiming to provide an abundance of call features, feature traffic needs to be given a higher priority than both originating and terminating traffic.

Progress Traffic

Finally, another type of traffic is so-called "progress" traffic, which represents actions that are usually critical to call processing, for example a "release" message which ends a voice call and instigates billing. Clearly, such traffic must be handled with the highest priority because so many network resources have been expended by the time a release message is generated that it may be unacceptably expensive to back out of a blocked connection request. Another example of progress traffic is a supervision message received via the first or second ATM network 210, 212.

In addition to the resource manager 270, the multi-service gateway 200 also comprises a set of circuit-switched processing resources 102 and a set of packet-switched processing resources 204.

As in a conventional multi-service gateway 100, the circuit-switched processing resources are typically embodied as a cross-connect 102 that is connected at one end to the external circuit-switched ports 150A-N and has a like number of internal circuit-switched ports 155A-N. The cross-connect 102 applies circuit-switched connections in accordance with a mapping that is controlled from the resource manager 270. The mapping specifies circuit-switched connections, each of which is defined either between an external circuit-switched port and an internal circuit-switched port or between two external circuit-switched ports.

The packet-switched resources 204 can be embodied as a "pool" of individual port processing software entities (PPSEs) 204A-N. The size (capacity) of the pool is equal to the total number of PPSEs which generally, but not necessarily, corresponds to the total number of external packet-switched ports on the multi-service gateway, in this case equal to N. Thus, the PPSEs in the multi-service gateway 200 of FIG. 2 are not respectively dedicated to the N external packet-switched ports 160A-N; rather, they are "pooled" in such a way that at a given time, a PPSE is allocatable to any of the external packet-switched ports 160A-N.

Allocation of the port processing software entities to the external packet-switched ports is controlled by the resource manager 270. The resource manager 270 can be embodied as a micro-processor, read-only memory (ROM), digital signal processor (DSP) or other device capable of running a series of instructions stored in memory and defining a resource management algorithm. The resource manager 270 responds to connection requests received from the connection server/broker 275 by accordingly setting the mapping of the cross-connect 102 and allocating the PPSEs to the external packet-switched ports in accordance with the resource management algorithm.

As will be apparent from the discussion to follow, part of the resource management algorithm consists of monitoring the usage level of the resource pool. This can be done using a global counter variable in software. Each time a PPSE is allocated, the counter variable of the pool is incremented. Each time a PPSE ceases to be used (e.g., after a call is ended), the counter variable of the pool is decremented. In addition, an occupancy threshold is defined, e.g., as a software constant. The occupancy threshold is less than the size of the pool. It imposes a limit on the number of PPSEs available for satisfying lower-priority connection requests. This provides a safety measure to prevent the onset of a situation in which a high-priority connection request cannot be satisfied as a result of all available resources having been taken up in response to lower-priority connection requests.

Figure 3:
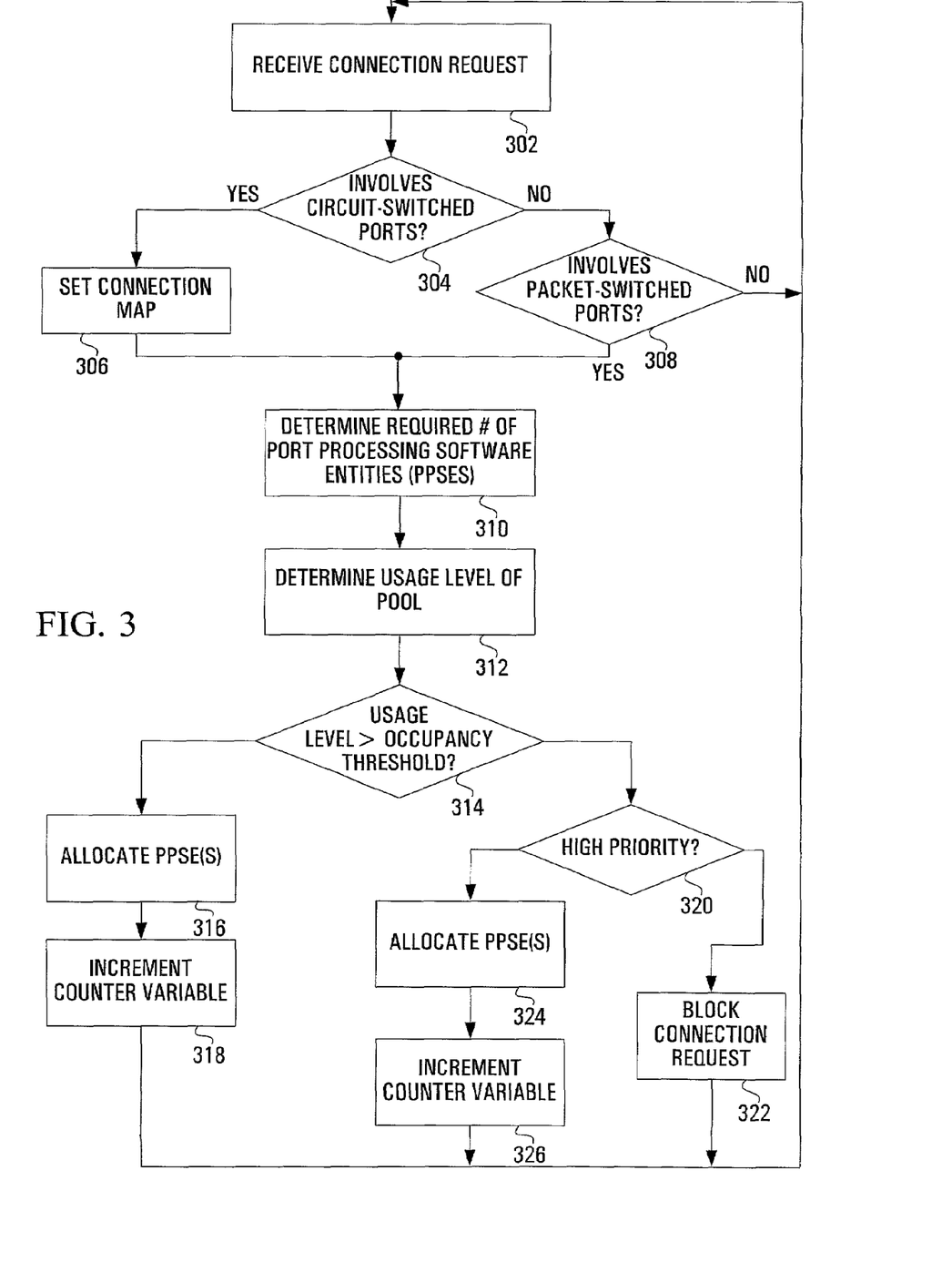
FIG. 3 is a flowchart showing the operational steps in a resource allocation algorithm executed by the multi-service gateway of FIG. 2.

With reference now to FIG. 3, an example resource management algorithm is described in terms of its logical flow.

Step 302

The resource manager 270 receives a connection request from the connection server/broker 275. The connection request specifies the connection type and the two external ports involved in the proposed connection and the priority level of the proposed connection. Depending on the connection type and the external ports involved in the proposed connection, different processing resources will be required. Also, a priority level is associated with the connection request. If the priority level is not explicitly specified in the connection request, it may be inherent from the type of traffic (e.g., originating, terminating, feature, progress) associated with the proposed connection. To continue handling the connection request, the resource manager 270 proceeds to STEP 304.

Step 304

The resource manager 270 determines whether any of the two ports specified in the connection request is an external circuit-switched port. If so, the resource manager 270 proceeds to STEP 306; otherwise, the resource manager 270 skips STEP 306 and proceeds directly to STEP 308.

Step 306

The resource manager 270 appropriately sets the connection map of the cross-connect 102. For a type 401 connection, this would consist of connecting the two involved external circuit-switched ports in a loop-back fashion. For a type 402 connection or a type 403 connection, this step would consist of setting the connection map of the cross-connect 102 so that the appropriate external circuit-switched port is connected to the appropriate internal circuit-switched port. The resource manager 270 then proceeds to STEP 310.

Step 308

The resource manager 270 determines whether any of the two ports specified in the connection request is an external packet-switched port. If so, the resource manager 270 proceeds to STEP 310; otherwise, the resources manager 270 returns to STEP 302 and waits for the next connection request. On the way back to STEP 302, some higher level protocol work may occur, such as run call processing applications.

Step 310

This step is entered when at least one of the ports specified in the connection request is an external packet-switched port. The resource manager 270 then determines whether one or both ports specified in the connection request are external packet-switched ports in order to determine whether one or two PPSEs are required. The resource manager 270 proceeds to STEP 312.

Step 312

The resource manager 270 determines the usage level of the resource pool 204 by consulting the counter variable. The resource manager 270 proceeds to STEP 314.

Step 314

The resource manager 270 compares the usage level (counter variable) to the above-described occupancy threshold. If the usage level is below the occupancy threshold, then this signifies that there are sufficient PPSEs to handle the connection request and the resource manager 270 proceeds to STEP 316; otherwise, the resource manager 270 proceeds to STEP 320. (It is noted that because the comparison is biased by the occupancy threshold, it is possible that one or more unused PPSEs are in fact available, despite the opposite result obtained from the comparison. Whether such "hidden" resources are used depends on the priority level of the connection request as determined later at STEP 320.)

Step 316

The resource manager 270 allocates a PPSE in the resource pool 204 to each of the appropriate external-packet switched port(s) and re-programs it to perform the functionality necessitated by the proposed connection. Re-programming of a PPSE can be done by setting a software flag so as to cause a desired portion of code to be executed. For example, to establish a connection involving one external circuit-switched port and one external packet-switch port, a PPSE may be caused to execute a section of code that performs TDM-ATM conversion. The resource manager 270 proceeds to STEP 318.

Step 318

The resource manager 270 increments the counter variable which monitors the usage level of the resource pool. The counter variable is incremented by the number of PPSEs allocated at STEP 316. The resource manager 270 then returns to STEP 302 and waits for the next connection request. Again, some higher level protocol work may occur on the way back to STEP 302.

Step 320

It is recalled that this step is entered when execution of STEP 314 showed that there were insufficient PPSEs in the resource pool to permit establishment of the proposed connection. However, because the value of the counter variable was compared to the occupancy threshold and not the total size of the resource pool, it is possible that an unused PPSE is in fact available and whether such a "hidden" resource is used depends on the priority level of the connection request. STEP 318 therefore involves the resources manager 270 comparing the priority level of the proposed connection to a "priority threshold".

By way of example, the priority threshold may be set to the priority level of feature traffic, so that the only proposed connections deemed to have a "high" priority level are those associated with feature traffic or progress traffic. Alternatively, the priority threshold may be a function of the amount of already-allocated ATM network resources. If the priority level of the request is below the priority threshold, the resource manager 270 proceeds to STEP 322, otherwise the resource manager 270 proceeds to STEP 324.

Step 322

The resource manager 270 blocks the connection request. In other words, no PPSEs will be allocated for satisfying the connection request. The resource manager 270 may report blockage of the request to the connection server/broker 275. The counter variable which monitors the usage level of the resource pool does not increase. The resource manager 270 returns to STEP 302 and waits for the next connection request. On the way back to STEP 302, some higher level protocol work may occur, such as run call processing applications.

Step 324

The resource manager 270 allocates a PPSE to satisfy the connection request. The resource manager 270 re-programs the PPSE so that it can perform the required function, e.g., TDM-ATM conversion, for the required external packet-switched port or ports. Re-programming of a PPSE can be done by setting a software flag so as to cause a desired portion of code to be executed. The resource manager 270 proceeds to STEP 326.

Step 326

The resource manager 270 increments the counter variable which monitors the usage level of the resource pool. The counter variable is incremented by the number of PPSEs allocated at STEP 316. The resource manager 270 then returns to STEP 302 and waits until the next connection request is received.

When resource usage is managed as described herein above, the counter variable will increase with each allocation of a PPSE and will decrease whenever usage of a PPSE ceases. Once the usage level of the resource pool reaches the occupancy threshold, the remaining resources are only allocated to performing high-priority work. Since none of the PPSEs are specifically dedicated to performing the high-priority work and since none of the PPSEs are dedicated to specific ports, it follows that none of the PPSEs will be forced into an idle state, which increases the percentage of PPSEs that are available.

Although it is possible to envisage a scenario in which STEP 322 will attempt to allocate unavailable resources (e.g., when a high-priority ATM-ATM connection request is received after all PPSEs have been allocated to previously established high-priority connections), it is generally possible to select an occupancy threshold which, under most traffic conditions, will allow a high-priority connection request to be satisfied to within a reasonable probability.

Figure 5:
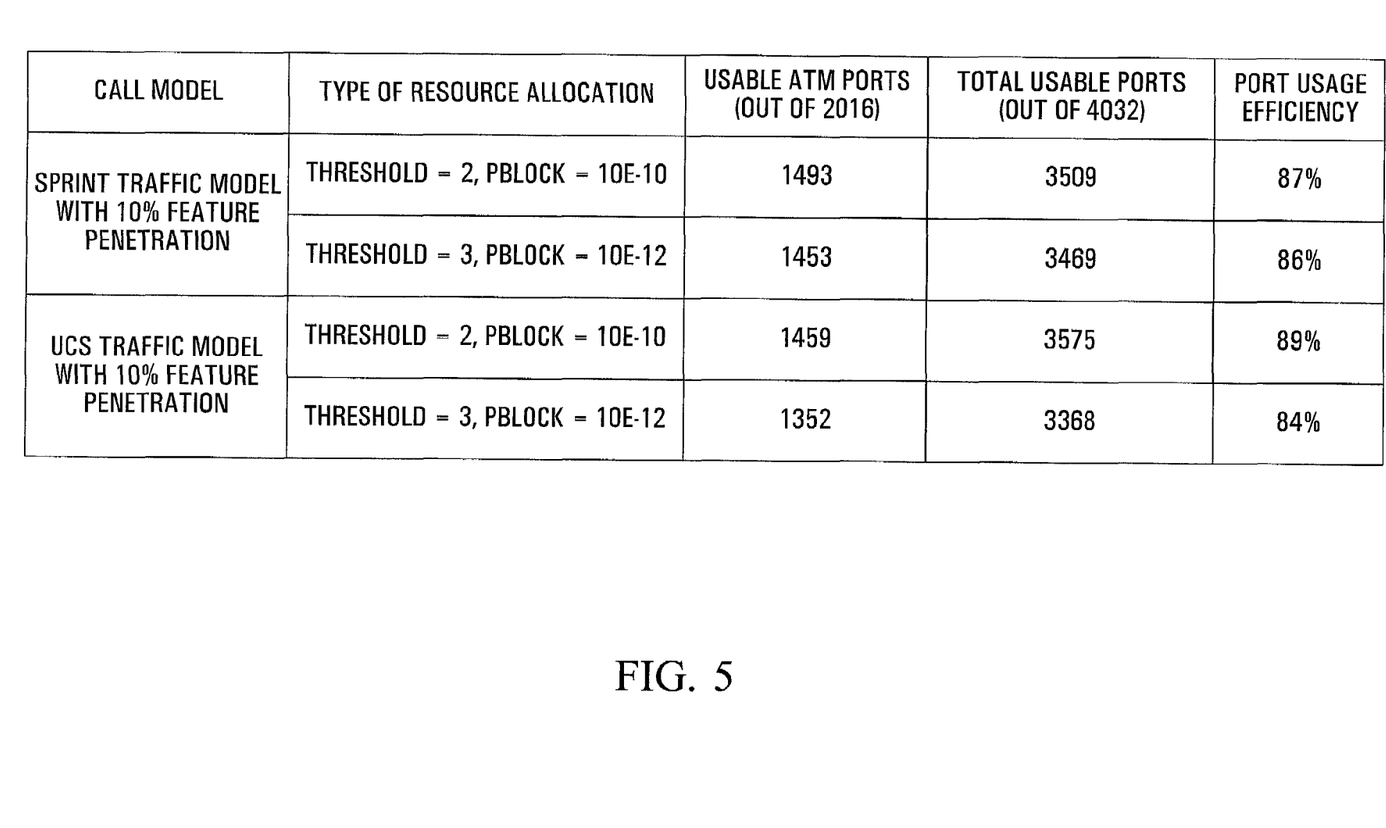
FIG. 5 is a table showing port usage efficiency for different traffic models, occupancy thresholds and probabilities of blocking.

Stated differently, the port usage efficiency (i.e., the percentage of ports which are capable of generating revenue) for a given probability of blocking will vary as a function of the traffic mix presented to the multi-service gateway 200. By way of example and with additional reference to FIG. 5, there is provided a table showing the port usage efficiency assuming 2016 external circuit-switched ports and 2016 external packet-switched ports, for different probabilities of blocking, occupancy thresholds and traffic models. The Sprint and UCS traffic models are known to those skilled in the art. From FIG. 5, it is seen that in each case, port usage efficiency is consistently in the 80-90% range. This is a marked improvement over the port usage efficiency which would exist if packet-switched port resources were dedicated to TDM-ATM conversion on a per-port basis.

It should be understood that modifications may be made without departing from the scope of the invention. For instance, it is possible to associate a different occupancy threshold with each priority level. In other words, a higher-priority connection request might be satisfied if there are greater than "M" unused PPSEs for some value of "M", while a lower-priority connection request might be satisfied only if the occupancy threshold is less than "M-L", for some values of "M" and "L" where M>L. Thus it is seen that use of a priority-dependent occupancy threshold provides yet another manner of deciding whether to allocate resources or block the connection request.

It should also be understood that the invention is not limited to ATM-based packet data networks but can be used with any type of packet data network protocol, including Ethernet and the Internet Protocol (IP). Therefore, reference to ATM should be regarded as examples only and not as an attempt to limit the invention to an ATM environment.

In an IP environment, for example, there will typically be no "ATM-like" connections on the network side and connections may instead be represented as destination addresses with a bandwidth profile against each instance.

Those skilled in the art should also appreciate that in some embodiments of the invention, all or part of the functionality previously described herein with respect to the resource manager 270 may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the resource manager 270 may be implemented as software consisting of a series of instructions for execution by a computer system. The series of instructions could be stored on a medium which is fixed, tangible and readable directly by the computer system, (e.g., removable diskette, CD-ROM, ROM, or fixed disk), or the instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the series of instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

We claim:

1. A method of processing a request for a connection through a multi-service gateway, comprising:
   determining a usage level of a resource pool; and
   determining a priority level of the connection request,
   if the usage level is below a pool occupancy threshold that is a function of the priority level of the connection request, allocating resources from the resource pool to satisfy the connection request;
   if the usage level is not below the occupancy threshold, allocating resources from the resource pool to satisfy the connection request only if the priority level of the connection request is higher than a priority threshold.

2. The method as claimed in claim 1, further comprising receiving the connection request prior to allocating resources from the resource pool.

3. The method as claimed in claim 1, further comprising receiving the connection request from a connection server/broker prior to allocating resources from the resource pool.

4. The method as claimed in claim 1, wherein the priority level of the connection request is a function of the type of traffic carried by the requested connection.

5. The method as claimed in claim 4, wherein each connection request is associated to a type of traffic selected from the group consisting of originating, terminating, feature and progress.

6. The method as claimed in claim 5, wherein the priority level of progress traffic is greater than the priority level of feature traffic, which is greater than the priority level of terminating traffic, which is greater than the priority level of originating traffic.

7. The method as claimed in claim 1, wherein the processing resources are software resources for processing packets.

8. The method as claimed in claim 1, wherein the processing resources are port processing resources.

9. The method as claimed in claim 1, wherein the processing resources are configured to perform conversion of a signal from a circuit-switched format to a packet-switched format.

10. The method as claimed in claim 9, wherein the circuit-switched format is a time-division-multiplexed (TDM) format.

11. The method as claimed in claim 9, wherein the packet-switched format is an asynchronous transfer mode (ATM) format or an Internet Protocol (IP) format.

12. The method as claimed in claim 1, further comprising:
    if no processing resources are allocated to satisfy the connection request, blocking the connection request.

13. The method as claimed in claim 11, further comprising reporting blockage of the connection request to a connection server/broker.

14. The method as claimed in claim 1, further comprising:
    determining whether circuit-switched connection resources are required to satisfy the connection request; and
    if circuit-switched connection resources are required to satisfy the connection request, setting a cross-connect mapping for controlling the circuit-switched connection resources.

15. The method as claimed in claim 1, further comprising selecting the pool occupancy threshold to achieve a probability of blocking that is less than a pre-determined value.

16. A multi-service gateway, comprising:
    a plurality of packet-switched ports;
    a pool of port processing software entities (PPSEs), each PPSE having sufficient capacity to provide processing for any of the packet-switched ports; and
    a resource manager configured to execute a method comprising receiving connection requests and, if a particular connection request involves at least one of the packet-switched ports, allocating a subset of the PPSEs in the pool for satisfying the particular connection request, as a function of a priority level of the particular connection request, as a function of a usage level of the pool and as a function of a pool occupancy threshold, wherein said allocating comprises:

determining the usage level of the pool; and if the usage level is below the pool occupancy threshold, allocating resources from the resource pool to satisfy the connection request;

if the usage level is not below the occupancy threshold, allocating resources from the pool to satisfy the connection request only if the priority level of the connection request is higher than a priority threshold.

17. The multi-service gateway as claimed in claim 16, wherein the resource manager is configured to determine the priority level of the connection request.

18. The multi-service gateway as claimed in claim 16, wherein each PPSE has the capability to perform conversion of a signal from a circuit-switched format to a packet-switched format.

19. The multi-service gateway as claimed in claim 18, wherein the circuit-switched format is a time-division-multiplexed (TDM) format.

20. The multi-service gateway as claimed in claim 18, wherein the packet-switched format is an asynchronous transfer mode (ATM) format or an Internet Protocol (IP) format.

21. The multi-service gateway as claimed in claim 16, wherein the resource manager is further adapted to block the connection request if no resources are allocated to satisfy the connection request.

22. The multi-service gateway as claimed in claim 21, wherein the resource manager is further adapted to report blockage of the connection request to a connection server/broker.

23. The multi-service gateway as claimed in claim 16, further comprising a plurality of circuit-switched ports and a set of circuit-switched connection resources, wherein the resource manager is further adapted to determine whether circuit-switched connection resources are required to satisfy the connection request and, if circuit-switched connection resources are required to satisfy the connection request, setting a cross-connect mapping for controlling the circuit-switched connection resources.

24. A multi-service gateway, comprising:

means for receiving a connection request;

means for determining a usage level of resources in a resource pool in the multi-service gateway; and means for allocating resources from the resource pool to satisfy the connection request if the usage level of the pool is below an occupancy threshold that is a function of the priority level of the connection request, otherwise determining a priority level of the connection request and allocating resources from the pool to satisfy the connection request only if the priority level of the connection request is higher than a priority threshold.

25. Computer-readable media tangibly embodying a program of instructions executable by a resource manager to perform a method of processing a received request for a connection through a multi-service gateway, the method comprising:

determining a usage level of resources in a resource pool in the multi-service gateway; and allocating resources from the resource pool to satisfy the connection request if the usage level of the pool is below an occupancy threshold that is a function of the priority level of the connection request, otherwise determining a priority level of the connection request and allocating resources from the pool to satisfy the connection request only if the priority level of the connection request is higher than a priority threshold.

26. At least one computer programmed to execute a process for processing a received request for a connection through a multi-service gateway, the process comprising:

determining the usage level of a resource pool in the multi-service gateway; and if the usage level is below a pool occupancy threshold that is a function of the priority level of the connection request, allocating resources from the resource pool to satisfy the connection request;

if the usage level is not below the occupancy threshold, allocating resources from the pool to satisfy the connection request only if the priority level of the connection request is higher than a priority threshold.

* * * * *